(12) United States Patent
Geaghan

(10) Patent No.: US 6,395,863 B2
(45) Date of Patent: May 28, 2002

(54) TOUCH SCREEN WITH POLARIZER AND METHOD OF MAKING SAME

(75) Inventor: Bernard O. Geaghan, Salem, NH (US)

(73) Assignee: Microtouch Systems, Inc., Methuen, MA (US)

( * ) Notice: Subject to any disclaimer, the term of this patent is extended or adjusted under 35 U.S.C. 154(b) by 0 days.

(21) Appl. No.: 09/776,289

(22) Filed: Feb. 2, 2001

Related U.S. Application Data

(60) Provisional application No. 60/179,873, filed on Feb. 2, 2000.

(51) Int. Cl.$^7$ ................................................ C08G 64/00
(52) U.S. Cl. ........................ 528/196; 428/412; 528/176; 528/193; 528/194; 528/196
(58) Field of Search .......................... 428/412; 528/176, 528/193, 194, 196

(56) References Cited

U.S. PATENT DOCUMENTS

| 5,396,351 A | 3/1995 | Gessel | 359/42 |
| 5,659,378 A | 8/1997 | Gessel | 349/96 |
| 6,020,945 A | 2/2000 | Sawai et al. | 349/119 |

FOREIGN PATENT DOCUMENTS

| JP | 63-69322 | 5/1988 |
| JP | 3-19228 | 2/1991 |
| JP | 3-121523 | 5/1991 |
| JP | 4-243412 | 8/1992 |
| JP | 4-326419 | 11/1992 |
| JP | 5-127822 | 5/1993 |
| JP | 5-43124 | 6/1993 |
| JP | 8-83515 | 3/1996 |
| JP | 8-122738 | 5/1996 |
| JP | 8-155988 | 6/1996 |
| JP | 8-161116 | 6/1996 |
| JP | 8-166849 | 6/1996 |
| JP | 9-16329 | 1/1997 |
| JP | 9-24571 | 1/1997 |
| JP | 9-006533 | 1/1997 |
| JP | 9-29881 | 2/1997 |
| JP | 9-43584 | 2/1997 |
| JP | 9-57894 | 3/1997 |
| JP | 9-156051 | 6/1997 |
| JP | 9-231002 | 9/1997 |
| JP | 9-262925 | 10/1997 |
| JP | 9-262926 | 10/1997 |
| JP | 9-262928 | 10/1997 |
| JP | 9-265351 | 10/1997 |
| JP | 10-24516 | 1/1998 |
| JP | 10-29261 | 2/1998 |
| JP | 10-67064 | 3/1998 |
| JP | 10-69352 | 3/1998 |
| JP | 10-69354 | 3/1998 |
| JP | 10-69355 | 3/1998 |
| JP | 10-133815 | 5/1998 |
| JP | 10-197852 | 7/1998 |
| JP | 10-260395 | 9/1998 |
| JP | 11-53118 | 2/1999 |

OTHER PUBLICATIONS

"Silquest® A–171™ Silane" product information, 4 pgs.
"Polaroid "Durable KE" Polarizer", product brochure, Polaroid Corporation (1998), 3 pgs.
Mitani et al., "ITO Resistance Film Type Touch Panels", Special Issue: Vanguard of Liquid Crystal and PDP Development, English Translation included.

*Primary Examiner*—Terressa M. Boykin
(74) *Attorney, Agent, or Firm*—William D. Miller

(57) ABSTRACT

A topsheet for a touch screen includes a support layer having a touch surface and a second surface opposite the touch surface; a polarizer layer having a first surface and a second surface with the first surface of the polarizer in contact with the second surface of said support layer; and a first conductive layer in contact with the second surface of said polarizer.

46 Claims, 3 Drawing Sheets

TOUCH SCREEN WITH POLARIZER AND METHOD OF MAKING SAME

RELATED APPLICATIONS

This application claims benefit of U.S. Provisional Application No. 60/179,873 filed Feb. 2, 2000 entitled "POLARIZER TOUCH SCREEN FOR A LIQUID CRYSTAL DISPLAY DEVICE."

FIELD OF INVENTION

This invention relates to a touch screen with a polarizer in the top sheet and to such a touch screen integrated with an LCD, with one polarizer of the LCD in the topsheet of the touch screen.

BACKGROUND OF INVENTION

Touch screens are widely used in many applications, including computer interfaces, LCDs, and many of today's small portable devices such as personal data assistants and cellular telephones. Touch screen/LCD combinations are especially useful in such portable devices. Touch screens include, but are not limited to, resistive film type and capacitive touch screens.

The optical efficiency of typical resistive film type touch screens is 75 to 85%. LCDs are even less efficient, due to the polarizer layers which are inherent to polarizers, with typical optical efficiencies of only 50% being common.

Polarizer layers have been added to touch screens to improve the optical efficiency of touch screen/LCD combinations, however, the polarizer layer was placed above the polycarbonate support layer, i.e., closer to the touch surface of the touch screen. This implementation exposes the polarizer layer to substantial physical contact. Because the polarizer layer is less durable than the polyethylene terephthalate (PET) layer which is near the touch surface of typical touch screens, such a placement of the polarizer layer results in a less durable touch screen.

Additionally, the placement of the polarizer above the support layer requires that the support layer be optically isotropic for the touch screen/LCD combination to function properly. This results in a thicker and more costly touch screen because the polycarbonate support layer cannot be made from a drawn polycarbonate material, which is cheaper and may be drawn to much smaller thicknesses than polycarbonate materials which are cast or formed by other methods. Also, drawn polycarbonate material is not sufficiently optically isotropic for such applications.

One such structure is disclosed in the article "Vanguard of Liquid Crystal and PDP Development" by Y. Mitani, et al. (Japan, 1997) and is shown in FIG. 1. This structure includes a polarizer 56, comprising polyvinylalcohol (PVA) polarizing layer 50 sandwiched between two cellulose triacetate (CTA) layers 52, 54. This is coated on the top surface with a hardcoat 58, which reduces scratches on the top surface. The polarizer is bonded to polycarbonate support layer 60 coated with indium tin oxide (ITO) layer 62. The polycarbonate provides physical support required of a topsheet, and is optically isotropic.

SUMMARY OF THE INVENTION

It is therefore an object of this invention to provide an improved touch screen with a polarizer which is more durable.

It is a further object of this invention to provide such an improved touch screen which is lower in cost.

It is a further object of this invention to provide such an improved touch screen which is lighter in weight.

It is a further object of this invention to provide such an improved touch screen which is thinner.

It is a further object of this invention to provide a method of manufacturing such a polarizing topsheet for a touch screen.

This invention follows from the realization that touch screens can benefit greatly from having a polarizer layer below the support layer of the topsheet to provide the optical benefits of a polarizer layer while being more durable, less costly, thinner and lighter than polarizer layers above the support layer.

The present invention features a topsheet for a touch screen including a support layer having a touch surface and a second surface opposite the touch surface, a polarizer layer having a first surface and a second surface with the first surface of the polarizer in contact with the second surface of the support layer, and a first conductive layer in contact with the second surface of the polarizer.

In a preferred embodiment, the support layer may be a polyester sheet or it may be a polycarbonate sheet. The polarizer layer may include a K type polarizer. A first hardcoat layer may be in contact with the second surface of the polarizer layer and the first conductive layer may be in contact with the first hardcoat layer. The first hardcoat layer may have a roughened finish.

An adhesion promoting agent may be in contact with the second surface of the polarizer layer. A second hardcoat layer may be in contact with the touch surface of the support layer. The first conductive layer may include a plurality of discrete sections of conductive material.

The touch screen may be a resistive film type touch screen, and the first conductive layer may engage a second conductive layer of the touch screen.

This invention also features a method for manufacturing a topsheet including providing a support layer having a touch surface and a second surface opposite the touch surface, laminating a polarizer layer to the second surface of the support layer, the polarizer layer having first and second surfaces, and coating the second surface of the polarizer layer with at least a conductive coating.

In a preferred embodiment, the method may also include applying a first hardcoat layer to the second surface of the polarizer layer prior to the coating step. An adhesion promoting agent may be applied to the second surface of the polarizer layer before applying the first hardcoat layer. The hardcoat layer may include a rough surface. A second hardcoat layer may be applied to the touch surface of the support layer.

The coating step may be a vacuum sputtering process. The polarizer layer may be vacuum etched prior to the coating step. The first hardcoat layer may be plasma etched before the vacuum sputtering process. A thin film metal oxide layer may be applied to the second surface of the polarizer layer before the coating step. A thin film metal oxide layer may be applied to the first hardcoat layer before the coating step.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
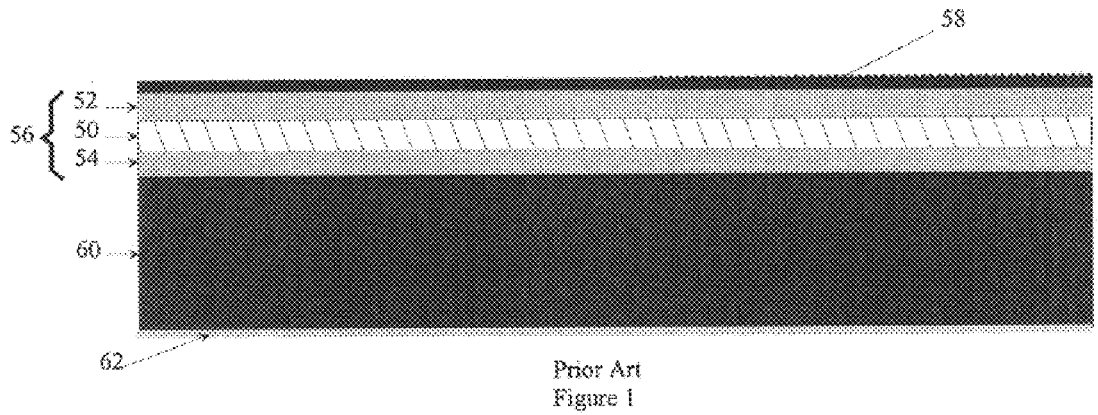
FIG. 1 is a cross-sectional view of a prior art topsheet with polarizer.
Figure 2:
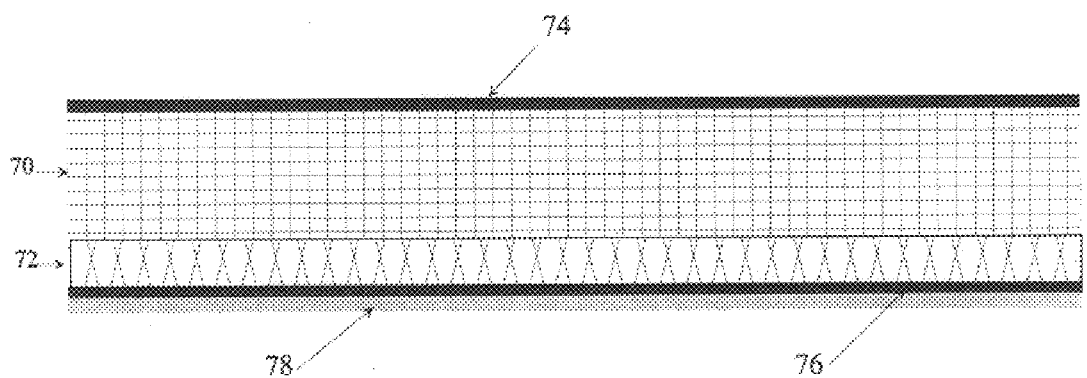
FIG. 2 is a cross-sectional view of a topsheet with a polarizer according to the present invention.

The present invention features a polarizer topsheet as shown in FIG. 2 which overcomes the technology problems found in prior art. The polarizer topsheet in FIG. 2 has a PET or polycarbonate support layer 70 laminated above the polarizer 72. The thickness of the PET or polycarbonate support layer is between 0.001 and 0.010 inches. This construction with the support layer above the polarizer protects the polarizer material from damage caused by the crushing pressure on the topsheet resulting from finger or stylus contact. It also reduces the potential for damage due to flexing of the topsheet as it is pressed by a finger or stylus, by reducing the radius of flex of the polarizer material.

A hardcoat 74 may be coated on the top surface of the topsheet. This protects the topsheet from scratches. Hardcoat is typically a cured acrylic resin, coated onto the surface of a substrate by applying a liquid acrylic material, then evaporating away the solvents in the liquid, then curing the acrylic with UV light. The acrylic may also contain silica particles. These transparent particles give a roughened finish to the cured hardcoat, giving it anti-glare optical properties. Hardcoat materials and coating services such as the Terrapin product from Tekra Advanced Technologies Group in Berlin, Wis. have proven suitable for the purposes described herein.

A hardcoat 76 may also be coated on the bottom surface of the topsheet, between the polarizer 72 and the conductive coating 78. This hardcoat protects the polarizer and reduces the dehydration and other effects of vacuum and heat on the polarizer during the conductive coating process. In addition, an anti-glare hardcoat under the conductive coating has the effect of diffusing light that is reflected from the adjacent conductive coating layer, reducing glare and also reducing Newton rings which otherwise form due to the proximity of two reflective conductive coating layers separated by an air gap and spacer dots. The hardcoat between the polarizer and the conductive coating also protects the polarizer from physical damage when pressure is put onto the topsheet by finger touch or stylus. Such pressure causes flexing of the topsheet and also can cause damage where the touch screen spacer dots are pressed against the topsheet causing local, severe deformation of the topsheet. The relatively high durometer of the acrylic and silica hardcoat relative to the polarizer material reduces local stresses on the polarizer material under touch or stylus pressure.

The conductive coating described herein is typically ITO (indium tin oxide) with a conductivity between 100 ohms per square and 2000 ohms per square. For higher resistance in the range of 1000 to 4000 ohms per square, tin antimony oxide is sometimes used. These coatings are typically applied onto sheets of organic materials such as PET, using a vacuum sputtering process. The vacuum sputtering process may include plasma etching of the support layer, followed by sputtering of one or more coats of metal oxides. For touch screen use, the last layer to be deposited is a conductive layer, so the surface is conductive. Thin film layers of silicon dioxide and/or titanium oxides may be used in combination with the conductive layer in suitable thicknesses to form an anti-reflective stack. Typical thickness of each layer for this purpose is ¼ wave of visible light. The lower layers of metal oxides may also be selected to serve the purpose of enhancing adhesion of the conductive metal oxide layer. Deposition of such layers of thin film metal oxides is done by Neovac of Santa Rosa, Calif. and others.

Figure 3:
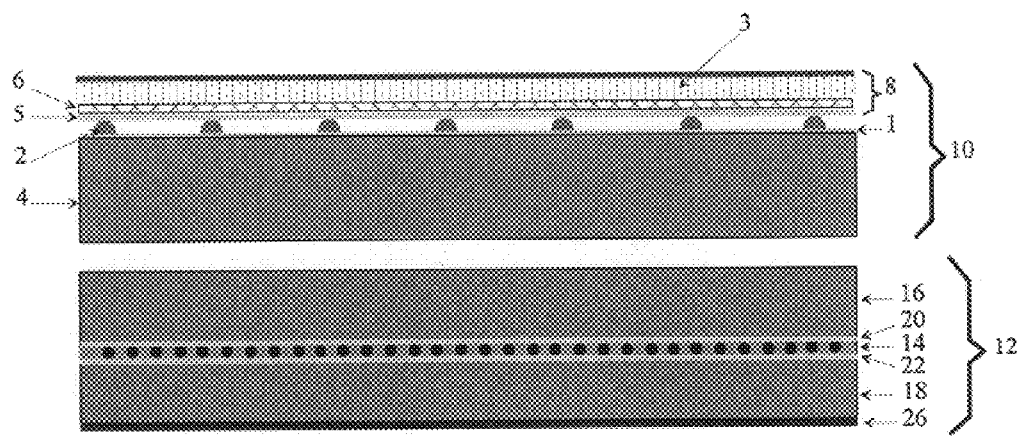
FIG. 3 is a cross-sectional view of a touch screen with a topsheet with a polarizer, combined with an LCD, according to the present invention.

A resistive film type touch screen 10 with a topsheet 8 including a polarizer layer 6 combined with an LCD 12 is shown in FIG. 3. Touch screen 10 includes substrate 4, typically glass, coated with a transparent conductor 1, typically Indium Tin Oxide (ITO). The ITO is typically applied in a vacuum sputtering process which may also include additional layers of sputtered materials such as silicon dioxide ($SiO_2$) adjacent to the ITO 1. Topsheet 8 is separated from substrate 4 by spacer dots 2. Topsheet 8 includes a layer of plastic 3, typically PET, polarizer layer 6, and ITO layer 5.

The LCD 12 comprises a layer of liquid crystal material 14 sandwiched between 2 substrates 16, 18, typically made of glass. Layers of ITO 20, 22 are deposited on each substrate adjacent to the liquid crystal material. Electrical signals are selectively applied to specified areas of the liquid crystal material via signal lines patterned in the ITO. Polarizer 26 is laminated onto glass substrate 18. With polarizer layer 6 in topsheet 8, there is no need for a polarizer layer on glass substrate 16, as would be typical of an LCD without topsheet 8 according to the present invention.

All materials between the two polarizers of an LCD must be optically isotropic. An LCD functions by orienting light into certain polarities, and any material which diffuses, refracts, or changes polarity of light will reduce the performance of the LCD. Glass and some polycarbonates are optically isotropic. PET is not. Thus, the construction of a polarizer topsheet must use all isotropic materials below the polarizer layer. Materials meeting this requirement include some polycarbonates and cellulose triacetate (CTA). By placing polarizer layer 6 below support layer 3, it is possible to use non-optically isotropic PET for layer 3.

There are several types of polarizing materials, including reflective polarizers, dichroic polarizers, and hybrid combinations of reflective and dichroic polarizers, as described in U.S. Pat. No. 6,096,375. Dichroic polarizer types include H and K type. Both H and K type were invented by Land and Rogers, and are described in U.S. Pat. Nos. 2,173,304; 2,255,940; and 2,306,108. H polarizers are used in many commercial applications, including virtually all current LCD displays. H polarizers are made by linear orientation (Stretching) of a polyvinylacohol (PVA) film, the surface of which is then imbibed with an iodine solution which forms the required chromophores. A boron complex is then used to stabilize the coating. Sheets of cellulose triacetate (CTA) are then laminated on both sides of the film to protect the relatively vulnerable polarizing layer. K polarizers also start with a PVA sheet, but the PVA molecular structure of linked H—C—H and H—C—OH molecules is selectively dehydrated to form a polyvinylene of linked HC molecules. Sufficiently long, oriented chains of the HC structure absorb light in the visible spectrum.

The molecular structure of K polarizers is more stable than H polarizers, so K polarizers are more robust for general use issues including temperature range. In spite of these advantages, K polarizers have not gained wide commercial use due to problems including cost, polarizing efficiency, and lack of absorbance in the red region of crossed K polarizers. These disadvantages are balanced, however, by the K polarizer's particular advantages in areas that are uniquely important for touch screen applications, including resistance to degradation by flexing, and resistance to degradation by crushing pressure of a stylus tip, and compatibility with chemicals such as acrylics used in hardcoats and with the chemicals used in PSA's (pressure sensitive adhesives).

Polarizer touch screens are used to great advantage on LCD displays. The upper polarizer required by an LCD may be laminated with the topsheet of the touch screen 8, rather than being mounted on the top glass substrate 16 of the LCD. The touch screen may then be placed over the LCD display, or alternatively the touch screen substrate 4 may be eliminated, and transparent conductor 1 may be coated directly onto the LCD substrate 16, so the LCD substrate 16 serves as the substrate of the touch screen. This fully integrated touch screen/LCD configuration is possible only if the top LCD polarizer is moved to the topsheet 8.

There are several advantages of such a polarizer touch screen and LCD combination. The optical efficiency may be improved, e.g., ambient light reflections can be significantly reduced. The structure allows omission of the touch screen substrate, with the topsheet mounted directly on the LCD. This reduces thickness and weight. Cost may be minimized because of reduced components, and because integration may be done as part of the LCD manufacturing process.

Figure 4:
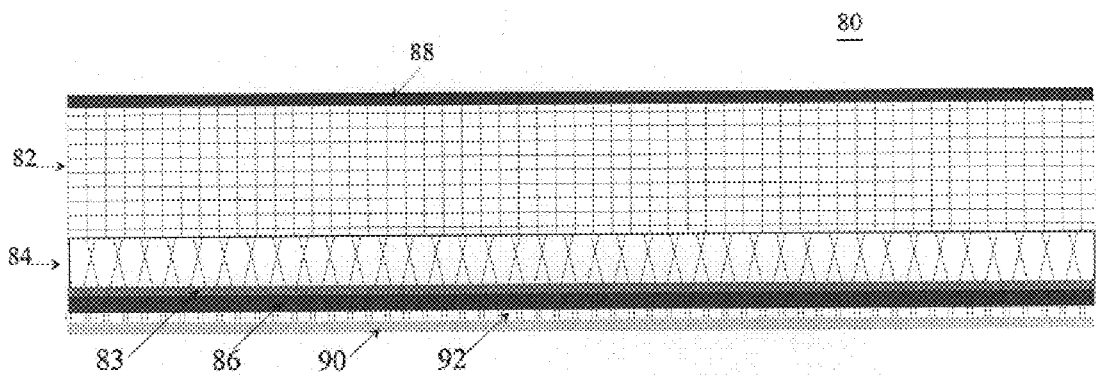
FIG. 4 is a cross-sectional view of a topsheet with a polarizer and a thin metal oxide film, according to the present invention.

A preferred embodiment of the topsheet structure 80 is shown in FIG. 4. PET is used for the support layer 82. PET is lower in cost than polycarbonate. PET is proven structurally and optically appropriate for the topsheet application, and it is available in thinner sheets than polycarbonate. Optically isotropic polycarbonate cannot be made by drawing the material into sheets. This limits the minimum thickness of polycarbonate sheets to the range of 0.010 inches, which is greater than the optimal topsheet thickness of 0.005 to 0.008 inches. Polycarbonate is also more expensive than PET.

Though any polarizer 84 may be laminated to the PET layer, the preferred polarizer material is a K type polarizer. 3M Optical Systems Division in Norwood, Mass., formerly a division of Polaroid, sells a commercially available K polarizer known as "KE".

Optically isotropic hardcoat material is used for hardcoat 86. Cured acrylic hardcoat materials such as the brand name Terrapin from Tekra Advanced Technologies Group in Berlin, Wis. have sufficiently low birefringence to qualify for this purpose.

An adhesion promoter 83 may be used to improve the bond between the polyvinylene based K polarizer and the acrylic hardcoat 86. It was found that silane primer vinyltrimethoxysilane, $[Si(OCH_3)_3]$ applied to the polarizer surface immediately prior to hardcoating, provided sufficient adhesion to withstand the demanding requirements of a touch screen. The primer that was found best is made by Witco of Greenwich, Conn., USA under the brand name Silquest A-171. K polarizers are sufficiently chemically stable to tolerate application of the silane adhesion promoter without degrading optical performance of the polarizer.

Second hardcoat 88 may be applied to the touch surface of support layer 82. Topsheet structure 80 comprising support layer 82, polarizer 84, adhesion promoter 83 and first hardcoat 86 is vacuum sputter coated with conductive coating 90. The design of topsheet structure 80 allows it to withstand the temperatures and high vacuum environment of the sputter coating process, as well as vacuum plasma etching process. Thin film metal oxide layer 92 may be applied to conductive coating 90. Thin film metal oxide layer 92 may be a multi-layer structure and may be useful as an anti-reflective stack.

Figure 5:
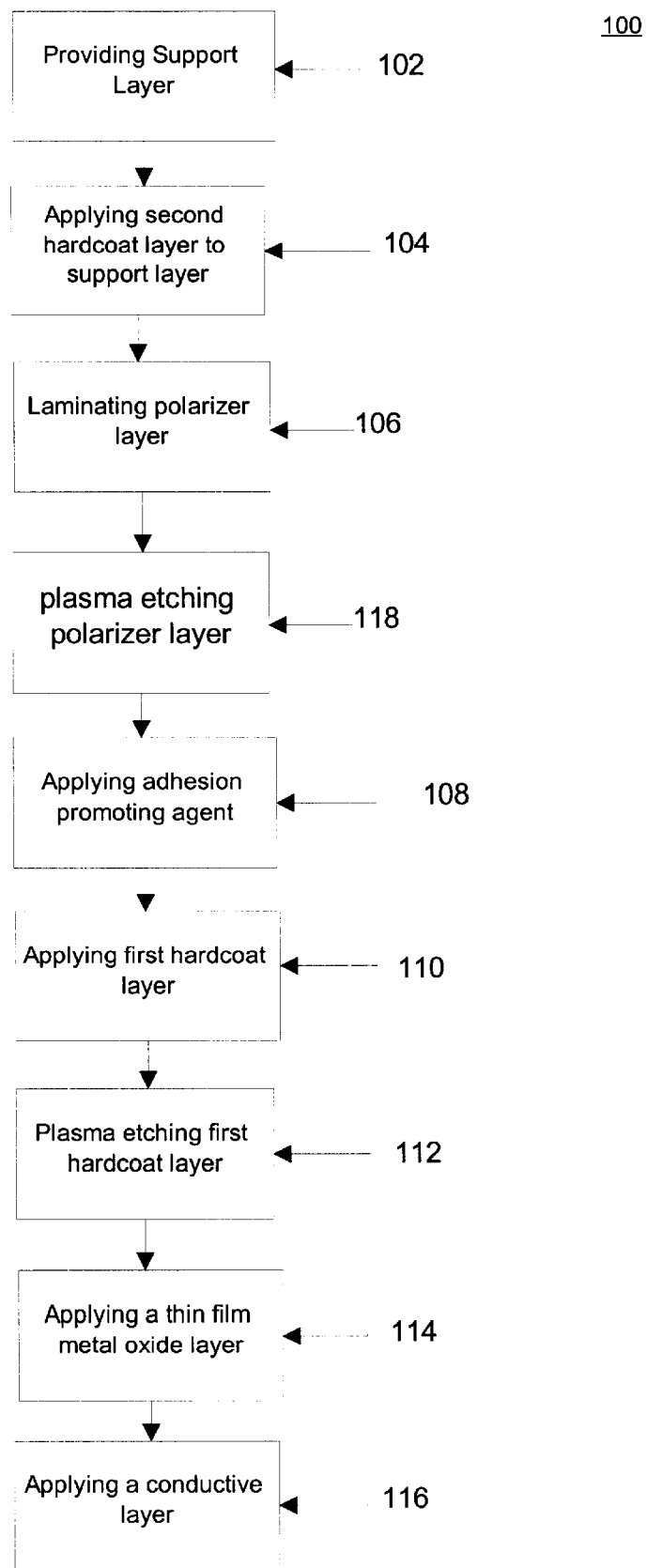
FIG. 5 is a flow diagram of a method of manufacturing a topsheet with a polarizer layer according to the present invention.

A method 100 for manufacturing a topsheet with a polarizer layer is shown in FIG. 5. Method 100 includes the steps of providing a support layer having a touch surface and a second surface opposite the touch surface, step 102, laminating a polarizer, having a first surface and a second surface, to the second surface of the support layer, step 106, and coating the second surface of the polarizer with a conductive layer, step 116. Applying a first hardcoat layer to the polarizer, step 110, may be done prior to coating step 116. Applying an adhesion promoting agent to the polarizer, step 108, may be done prior to applying step 110. After applying step 110, plasma etching of the hardcoat layer, step 112, may be performed. Applying a thin film metal oxide layer, step 114 may be performed before coating step 116. Step 114 may be performed more than once to that a multi-layer anti-reflective stack is formed. Applying a second hardcoat layer to the touch surface of the support layer, step 104, may also be performed.

The improved topsheet of this invention may be used to advantage in several different configurations. These include a resistive polarizer touch screen overlaid on an LCD; a resistive polarizer touch screen, laminated to an LCD; and a fully integrated LCD and resistive polarizer touch screen. These improved configurations can reduce optical reflectance of the touch screen by 15% to 30% while reducing thickness of the touch screen by as much as 85%.

While polarizer touch screens can be used to greatest cost advantage on LCD's, they are also useful with any type of display including CRT's, OLED's, and plasma displays in applications where minimizing reflections is important. For example, when a display and touch screen are used outdoors, the display must be readable in a wide range of ambient light conditions, including direct sunlight and darkness. Examples of such applications include outdoor ATM machines, ticketing machines, and gasoline pumps. Where sunlight readability is required, a polarizer touch screen's reduced reflections become a major benefit worth the added cost of a polarizer.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A topsheet for a touch screen comprising
   a support layer having a touch surface and a second surface opposite the touch surface;
   a polarizer layer having a first surface and a second surface with the first surface in contact with the second surface of said support layer; and
   a first conductive layer in contact with the second surface of said polarizer.
2. The topsheet structure of claim 1 wherein the support layer is a polyester sheet.
3. The topsheet structure of claim 1 wherein the support layer is a polycarbonate sheet.
4. The topsheet structure of claim 1 wherein the polarizer layer includes a K type polarizer.
5. The topsheet structure of claim 1 including a first hardcoat layer in contact with the second surface of said polarizer layer and said first conductive layer is in contact with said first hardcoat layer.
6. The topsheet structure of claim 5 wherein said first hardcoat layer has a roughened finish.
7. The topsheet structure of claim 5 including an adhesion promoting agent in contact with the second surface of said polarizer layer.
8. The topsheet structure of claim 1 including a second hardcoat layer in contact with the touch surface of said support layer.
9. The topsheet structure of claim 1 wherein said first conductive layer includes a plurality of discrete sections of a conductive material.
10. The topsheet structure of claim 1 wherein the touch screen is a resistive film type touch screen and said first conductive layer engages a second conductive layer of the touch screen.
11. A method of manufacturing a topsheet for a touch screen comprising
    providing a support layer having a touch surface and a second surface opposite the touch surface;
    laminating a polarizer layer to the touch surface of said support layer, said polarizer layer having a top surface and a bottom surface; and
    coating the bottom surface of said polarizer layer with at least a conductive layer.
12. The method of manufacturing a topsheet of claim 11 further comprising applying a first hardcoat layer to the bottom surface of said polarizer layer prior to said coating step.
13. The method of manufacturing a topsheet of claim 12 further comprising applying an adhesion promoting agent to the bottom surface of said polarizer prior to the step of applying said first hardcoat layer.
14. The method of manufacturing a topsheet of claim 12 wherein said hardcoat layer includes a rough surface.
15. The method of manufacturing a topsheet of claim 11 further comprising coating the touch surface of said support layer with a second hardcoat layer.
16. The method of manufacturing a topsheet of claim 12 wherein said coating step is a vacuum sputtering process.
17. The method of manufacturing a topsheet of claim 16 further comprising plasma etching said first hardcoat layer prior to said vacuum sputtering process.
18. The method of manufacturing a topsheet of claim 11 further comprising applying at least one thin film metal oxide layer to the bottom surface of said polarizer layer prior to said coating step.
19. The method of manufacturing a topsheet of claim 12 further comprising applying at least one thin film metal oxide layer to said first hardcoat layer prior to the coating step.
20. The method of manufacturing a topsheet of claim 11 wherein said coating step is a vacuum sputtering process.
21. The method of manufacturing a topsheet of claim 20 further comprising plasma etching said polarizer layer prior to said coating step.
22. A touch panel, comprising:
    a touch sheet formed from a support layer, a polarizer layer, and a first conductive layer laminated together, the polarizer layer being disposed between the support layer and the first conductive layer, the support layer being disposed on a viewing side of the touch sheet.
23. A touch panel as recited in claim 22, further comprising a second conductive layer spaced apart from the first conductive layer of the touch sheet.
24. A touch panel as recited in claim 23, wherein the touch sheet is adapted to resiliently flex towards the second conductive layer under an applied pressure on the viewing side of the touch sheet.
25. A touch panel as recited in claim 23, further comprising spacer dots disposed between the first and second conductive layers.
26. A touch panel as recited in claim 23, further comprising a substrate layer, the second conductive layer being disposed on the substrate layer, between the substrate layer and the touch sheet.
27. A touch panel as recited in claim 22, further comprising a first hardcoat layer disposed on a touch surface of the support layer.
28. A touch panel as recited in claim 22, further comprising a second hardcoat layer disposed between the first polarizer layer and the first conductive layer.
29. A touch panel as recited in claim 28, wherein the second hardcoat layer has a roughened finish.
30. A touch panel as recited in claim 28, further comprising an adhesive promoter disposed between the first polarizer layer and the second hardcoat layer.

31. A touch panel as recited in claim 22, further comprising an antireflection layer disposed between the first polarizer layer and the first conductive layer.

32. A touch panel as recited in claim 22, wherein the support layer is a polyester sheet.

33. A touch panel as recited in claim 22, wherein the support layer is a polycarbonate sheet.

34. A touch panel as recited in claim 22, wherein the polarizer layer includes a K type polarizer.

35. A touch panel as recited in claim 22, wherein the first conductive layer includes a plurality of discrete sections of a conductive material.

36. A display system, comprising:
   a display unit for displaying information to a viewer position; and
   a touch unit disposed between the display unit and the viewer position, the touch unit including a touch sheet formed from a support layer, a first polarizer layer, and a first conductive layer laminated together, the first polarizer layer being disposed between the support layer and the first conductive layer, the support layer being disposed toward the viewer position.

37. A display system as recited in claim 36, wherein the display unit is a liquid crystal display (LCD) unit.

38. A display system as recited in claim 37, wherein the LCD unit includes first and second substantially parallel substrate layers, a liquid crystal layer is disposed between a first side of the first substrate layer and a first side of the second substrate layer, and the touch unit is disposed between the first substrate layer and the viewer position.

39. A display system as recited in claim 38, further comprising a second polarizer layer disposed to a second side of the second substrate layer opposite the first side of the second substrate layer.

40. A display system as recited in claim 37, wherein the touch unit further includes a second conductive layer spaced apart from the first conductive layer.

41. A display system as recited in claim 40, wherein the second conductive layer is disposed over a second side of the first substrate layer opposite the first side of the first substrate layer.

42. A display system as recited in claim 40, further comprising spacer dots separating the first conductive layer from the second conductive layer.

43. A display system as recited in claim 40, wherein the touch unit further includes a touch substrate layer disposed between the touch sheet and the display unit, the second conductive layer disposed on the touch substrate layer, between the touch substrate layer and the touch sheet.

44. A display system as recited in claim 36, wherein the touch unit further includes a second conductive layer spaced apart from the first conductive layer.

45. A display system as recited in claim 44, wherein the touch unit includes a touch substrate disposed between the touch sheet and the display unit, and the second conductive layer is laminated with the touch substrate.

46. A display system as recited in claim 44, wherein the second conductive layer is disposed on the display unit.

* * * * *